F. E. HARRIS.
SEARCH LIGHT CONTROLLER.
APPLICATION FILED MAR. 6, 1909.

953,332.

Patented Mar. 29, 1910.

WITNESSES:
Ludger A. Nicol.
John P. Mahoney

INVENTOR.
Frank E. Harris
BY Gardner W. Pearson
ATTORNEY.

UNITED STATES PATENT OFFICE.

FRANK E. HARRIS, OF LOWELL, MASSACHUSETTS.

SEARCH-LIGHT CONTROLLER.

953,332.

Specification of Letters Patent.   Patented Mar. 29, 1910.

Application filed March 6, 1909.   Serial No. 481,733.

*To all whom it may concern:*

Be it known that I, FRANK E. HARRIS, a citizen of the United States, residing at Lowell, in the county of Middlesex and State of Massachusetts, have invented certain new and useful Improvements in Search-Light Controllers, of which the following is a specification.

My invention relates to searchlights for automobiles and similar vehicles. It is intended to do away with the blinding glare from such search lights when vehicles coming from opposite directions are about to pass, or when such vehicles are passing through thickly settled districts.

My invention comprises a suitable pedal operated preferably by the feet of the driver, from the floor of the car in front of the driver's seat, and one or more suitable connecting rods which actuate a rocking arm attached to a shade for each lantern or search light.

Figure 1:
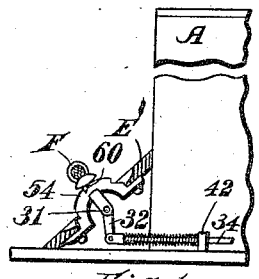
Figure 2:
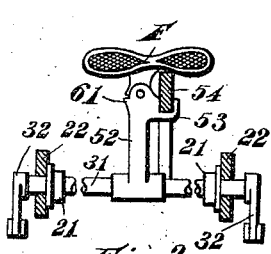
Figure 3:
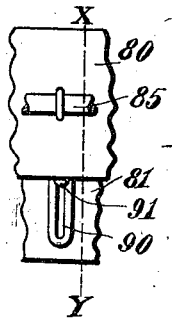
Figure 4:
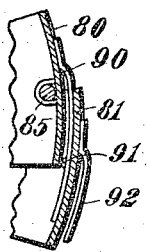
Figure 5:
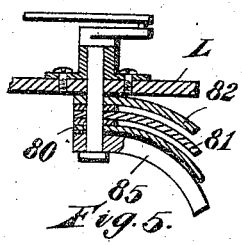
Figure 6:
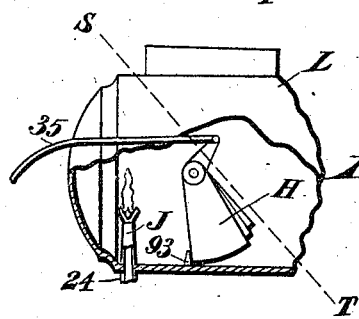
Figure 7:
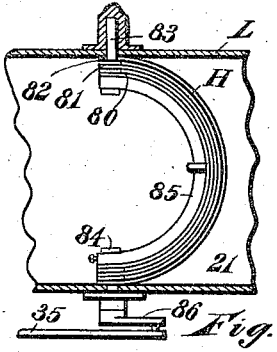
Figure 8:
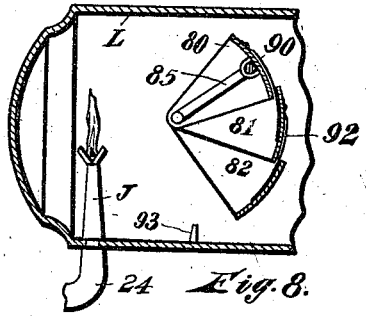
Figure 9:
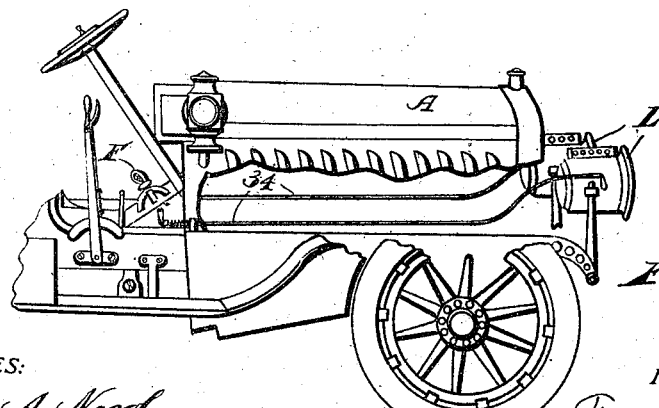

My invention is shown in the accompanying drawings in which—
Figure 1 is a side view of the operating pedal. Fig. 2 is a back view thereof. Fig. 3 is a detail view of the light shade from the back. Fig. 4 is a section of Fig. 3 from the right on line X Y. Fig. 5 is a sectional detail view of the axle and rocking arm of the left hand light. Fig. 6 is a sectional view from the side with the shade open of the right hand light. Fig. 7 is a view from a direction perpendicular to line S T from the right, the lantern frame being shown in section and the other parts in full. Fig. 8 is a sectional view from the right showing the shade closed. Fig. 9 shows the forward part of an automobile in perspective with part of the radiator broken away showing my device attached to both search lights.

A is an automobile hood or radiator and E is the floor or foot-board where the driver places his feet.
L is a search light of the usual acetylene pattern connected to a generator or tank by a flexible tube 24. It may be operated by electricity, oil, or any other suitable light producer.
31 is a pedal shaft which is hung transversely under foot board E by any suitable hangers or bearings. These may be flanged rings 21, 21, fastened to the inside of the side supports 22, 22, of foot board E.
Shaft 31 carries at each end an arm 32, to the ends of which are pivoted respectively connecting rods 34, 34. Preferably a tension spring encircles each connecting rod and connects each rod support 42 with the end of its connecting rod. By this means, the rods 34 and arms 32 are normally pressed forward away from the driver's seat. Shaft 31 also carries pedal arm 52 which has an elbow 53 notched to fit under the curved pedal check or stationary ratchet 54 in which are three V-shaped notches which rake forward. To the top of pedal arm 52 is pivoted transversely the double pedal F. Pedal F pivots to the right and left and is provided on one side with the pawl tooth 60 which fits the notches in stationary ratchet 54. The movement of pedal F in the other direction is limited by stop 61.

It will be readily seen that by placing the foot on the right side of pedal F and pushing forward, rods 34 are drawn backward and the device can be locked by releasing the foot pressure when tooth 60 is in either the front, back or middle notch. From the forward position, by pressing on the left of pedal F, the tooth 60 is raised out of the notch where it rests and springs 40 act to pull forward the rods 34 and bring pedal F to the extreme backward position.

Each search light lantern is provided with a collapsible shade H which is constructed in a general way like the vizor of an ancient helmet. It is formed of curved sections 80, 81 and 82 which nest loosely one within the other. Section 80 is loosely hung on one side on a pivot 83 and it is preferably stiffened by means of a wire 85 which is fastened to section 80 in any suitable way as by staples. Wire 85 is also connected by a set screw to the hub 84, which passes through the side of lantern L and carries a rocking arm 86. To the end of rocking arm 86 is pivoted the end of one of the rods 34. Rod 34 may be curved upward at 35 in order to meet rocking arm 86. I prefer to attach on the convex outside of section 80, a vertical spring 90 in which is a vertical slot, through which passes a headed pin 91 into the concave side of section 81. Section 81 is provided with a similar spring 92 through which another pin passes into section 82. These springs should bear yieldingly against the adjoining section and thus serve to keep the parts from rattling and they also serve to raise the lower part after the upper part has been raised to a certain distance. The sections 81 and 82 are loosely pivoted on pivot 83 and hub 84 respectively. The slot in the lifting springs 90 and 92 is of a length a little less than the height of a section of the shade, and pins 91 are so located that the first section must rise almost its height before the second section will be lifted by the end of the slot reaching the pin 91. The next spring and pin are similarly arranged so that when wholly raised, the sections of the shade slightly overlap as shown in Fig. 8. I preferably provide a stop 93 to limit the downward movement of the shade.

It is evident that by pushing pedal F into the forward notch, rods 34 will raise successively the three sections 80, 81 and 82 of the shade, as shown in Fig. 8, in front of the gas jet J or other source of light. The glare therefrom will be thus cut off from the front and the parts can be locked in either the open or closed position or the positions changed instantly. If it is desired to only partly obscure the light, pedal F can be rested in the middle notch whereby only the lower half of the search light will be obscured.

My invention resides mainly in the shade inside the search light and means for operating it from the outside. It is evident that other means than the pedal and springs described may be used to oscillate the rocking arm and to control it from the driver's seat.

What I claim as my invention and desire to cover by Letters Patent is:

1. A shade for automobile search lights, which comprises a series of curved sections of different sizes which nest one within the other and are pivoted at the same points, and spring connections between them whereby they may be raised successively.

2. In a shade for an automobile searchlight, a pivot, a series of curved sections of varying sizes loosely mounted thereon, a hub fixed to the inside section and passed loosely through the other sections, and a rocking arm fixed to the hub, combined with a spring in which is a slot on the outer side of the inner section, a headed pin on the inner side of the outer section, and a spring with a slot on the outer side and a headed pin on the inner side of each intermediate section, said pins and slots being in engagement.

3. The combination in an automobile, of a lantern frame, a source of light therein, with a pivot attached to the lantern frame, a series of curved nesting sections loosely hung on said pivot, vertical springs in which are vertical slots and headed pins in engagement with said slots attached to adjoining faces of said sections, a hub which passes through the other side of the lantern frame opposite the pivot and is fixed to the inner section, and a rocking arm fixed to said hub.

4. The combination in an automobile, of a lantern frame, and a source of light therein, with a pivot attached to the lantern frame, a series of curved nesting sections loosely hung on said pivot, a vertical spring in which is a vertical slot attached at its upper end to the outer side of the inner section, a headed pin on the inner side of the outer section, and a similar vertical spring in which is a vertical slot attached at its upper end to the outer side and a similar headed pin on the inner side of each intermediate section, each of said pins passing through the slot of the spring attached to the adjoining face of the adjoining section, a hub which passes through the other side of the lantern frame opposite the pivot and is fixed to the inner section, a rocking arm fixed to said hub, a rod pivoted to said arm, and an operating pedal located on the footboard and pivoted to said arm.

5. The combination in an automobile, of a lantern frame, a source of light therein, a pivot attached to the lantern frame, a hub revolubly mounted in said frame opposite the pivot, and a rocking arm carried by the hub, with an inside curved section loosely mounted on the pivot and fixed to the hub, a vertical spring so fixed at one end to the convex side of said section as to bear yieldingly against an adjoining middle section, a vertical slot therein, said middle section being loosely pivoted on said pivot and hub, a pin passed through said slot into the adjoining side of the middle section, a similar spring so attached to the outside of the middle section as to bear against the outer section, a slot therein, said outer section being loosely pivoted on said pivot and hub, a pin passed through said slot into the adjoining side of the outer section, with means for oscillating said rocking arm from the driver's seat.

6. A shade for automobile search lights, which comprises a series of curved sections of different sizes which nest one within the other and are pivoted at the same points, and connections between them whereby they may be raised successively, combined with means operative from the driver's seat for raising and lowering said sections.

7. A shade for automobile search lights, which comprises a series of curved sections of different sizes which nest one within the other and are pivoted at the same points, and connections between them whereby they may be raised successively, combined with means operative from the driver's seat for raising and lowering said sections, and means for locking the parts in open and closed positions.

8. In an automobile, a plurality of search lights, each of which comprises a series of curved sections of different sizes which nest one within the other and are pivoted at the same points inside each search light, connections between the sections of each light whereby they may be raised successively, and a rocking arm for each light attached to one of said sections, combined with a single operating pedal proximate the driver's seat, means for locking said pedal in different positions, a pedal shaft, and a plurality of connecting rods between said rocking arms and the pedal shaft.

In testimony whereof I hereto affix my signature in presence of two witnesses.

FRANK E. HARRIS.

Witnesses:
GARDNER W. PEARSON,
NATHAN D. PRATT.